United States Patent [19]

Hankins

[11] Patent Number: 4,646,411
[45] Date of Patent: Mar. 3, 1987

[54] ASSEMBLY FOR MOUNTING AND REMOVING A HUB FROM A SHAFT

[75] Inventor: William H. Hankins, Jeannette, Pa.

[73] Assignee: Elliott Turbomachinery Co., Inc., Jeannette, Pa.

[21] Appl. No.: 751,654

[22] Filed: Jul. 3, 1985

[51] Int. Cl.$^4$ ............................................. E21B 19/00
[52] U.S. Cl. ........................................................ 29/252
[58] Field of Search ............... 29/252, 264; 254/93 H, 254/93 R, 29 A, 29 R; 91/196; 92/117 R, 117 A; 285/382, 382.1-382.7, 39

[56] References Cited

U.S. PATENT DOCUMENTS

| | | | |
|---|---|---|---|
| 2,800,111 | 7/1957 | Schnurr et al. | 92/117 A |
| 3,033,597 | 5/1962 | Miller . | |
| 3,772,759 | 11/1973 | Bunyan . | |
| 3,977,065 | 8/1976 | Johnson | 29/252 |
| 4,279,068 | 7/1981 | Altmayer | 29/252 |

FOREIGN PATENT DOCUMENTS 990494 1/1983 U.S.S.R. .

Primary Examiner—Robert C. Watson
Attorney, Agent, or Firm—Robert P. Hayter

[57] ABSTRACT

An assembly for mounting and removing a hub from a shaft is disclosed. The combination of a cylinder and annular piston mounted about the cylinder defining a first and second cavity are utilized such that upon the application of pressurized fluid to the selected cavity the piston is displaced in a first direction for mounting the hub to the shaft and in a second direction for removing the hub from the shaft. Symmetrical apparatus adapted to be utilized with shafts having either left-handed or right-handed threads is additionally disclosed.

10 Claims, 2 Drawing Figures

ASSEMBLY FOR MOUNTING AND REMOVING A HUB FROM A SHAFT

BACKGROUND OF THE INVENTION

This invention relates to apparatus for mounting and removing a hub from a shaft. More specifically, the invention concerns utilization of a double-acting, hydraulic cylinder in an arrangement that may be used to both force a hub on a shaft and to remove a hub from a shaft.

In the rotary machine art it is common practice to move a hub of a coupling, impeller, disc and the like onto a shaft over which the hub has been preliminarily applied or to displace a hub from such a mounted position. Numerous types of apparatus have been used to accomplish this function.

The prior art includes devices wherein hydraulic fluid is supplied to expand a chamber to force a hub onto a shaft. Some means for securing the device relative to the shaft such that the expansion force may be used to force the hub onto the shaft is commonly provided. However, the use of the same apparatus to remove the hub from the shaft required additional structure for securing expansion apparatus to the hub. As can be seen in U.S. Pat. No. 3,772,759, additional structure may include longitudinally-extending rods which are secured internally within the hub. These rods are connected to a separate structure against which the expansion portion must be mounted.

Another type of device which is the subject matter of an earlier-filed, commonly assigned U.S. patent application, utilizes a cylinder and a piston which can be mounted in a first position with the cylinder secured to the shaft such that upon the application of a pressurized fluid, the piston is displaced forcing the hub on the shaft. However, to effect removal of the hub from the shaft, the assembly is reversed and placed in the opposite direction with the cylinder abutting the shaft and with an exterior surface of the piston threadably engaging an interior surface of the hub. Pressurized fluid may then be supplied to the cavity to effect displacement of the hub to remove it from the shaft.

The herein device is simpler and accomplishes multiple functions in a different manner. The herein device uses a cylindrical body portion to engage the threaded end of the shaft. The cylinder defines a portion of the cavity and a piston is mounted about the cylinder defining together with the cylinder a pair of cavities. These cavities are connected to a hydraulic system such that pressurized fluid may be supplied to the first cavity to force the piston in one direction for assembly and the second cavity to force the piston in an opposite direction for disassembly. In this manner a double-acting hydraulic cylinder is use for assembly and disassembly of hubs on a shaft. The use of a four-way valve together with a pressurized source of fluid may be utilized to control the direction of flow of the pressurized fluid.

Additionally in the herein device, a portion of the piston includes a piston flange which may either directly engage the coupling to force it into position, or may include a threaded opening into which a bolt may be secured such that upon pressurized fluid being supplied to the first cavity, the bolt engages the coupling forcing the coupling to its mounting position. To remove the coupling, a separate opening in the piston flange such as a clearance opening is utilized through which the bolt is inserted into a tapped opening in the coupling. The threaded opening could also be utilized to secure a bolt extending into a tapped opening of appropriate alignment.

SUMMARY OF THE INVENTION

It is an object of the present invention to provide a method and apparatus for moving the hub of a coupling, wheel, propeller, impeller or the like into and out of a force fit position on a shaft.

It is a further object of the present invention to provide a simple apparatus which may be utilized in the field to assemble and disassemble a hub on a shaft.

It is another object of the present invention to provide apparatus which may be utilized to assemble and disassemble a hub on a shaft without the necessity of heating either the hub or the shaft.

It is yet a further object of the present invention to provide apparatus which may be used at a factory for assembly or in the field for maintenance purposes for easily assembling and disassembling a hub from a shaft.

It is a still further object of the present invention to provide an assembly capable of being utilized in both left-handed and right-handed threaded shafts for mounting and disassembling hubs to the shaft.

It is yet a further object of the present invention to provide a combination cylinder and a piston for effecting removal and assembly of a hub to a shaft without requiring additional components and without requiring that the hub be preconfigured to mate with the additional components.

It is a still further object of the present invention to provide a fast, relatively inexpensive and easy to use apparatus and method for effecting assembly and disassembly of a hub from a shaft.

Other objects will be apparent from the description to follow and the appended claims.

The above objects are achieved according to a preferred embodiment of the invention by the provision of an assembly for mounting and removing a hub from a shaft having a portion for receiving the hub and a threaded end portion, said hub having an internal bore configured to mate with the shaft and at least one tapped opening. The assembly includes a cylinder means having end portions defining a threaded chamber at each end sized to threadably coact with the threaded end portion of the shaft and the center portion defining a sliding surface, a piston mounted for reciprocating motion about the cylinder means and including a projection which mates with the sliding surface of the cylinder center portion, said piston and cylinder means defining a first cavity and a second cavity between the cylinder means and the piston, and said cavities being located on opposite sides of the projection; piston flange means extending from the piston and including means to transmit force from the piston to the hub for forcing the hub on the shaft and means for transmitting force from the piston to the hub for removing the hub from the shaft; means for supplying fluid under pressure to the first cavity to displace the piston relative to the cylinder to force the hub on the shaft; and means for supplying fluid under pressure to the second cavity to displace the piston relative to the cylinder to force the hub off the shaft.

Additionally disclosed is an assembly for mounting and removing a hub from a shaft having a threaded end portion. The assembly includes cylinder means, including means for engaging the threaded end portion of the shaft and means defining a sliding surface; piston means having piston sliding surfaces coacting with the cylinder means sliding surface to define a first cavity and a second cavity; means for supplying fluid under pressure to the piston means including supplying fluid under pressure to the first cavity to displace the piston in a first direction and to the second cavity to displace the piston in an opposite second direction; and means for translating the force generated by the displacement of the piston in another direction to the hub to either mount or remove the hub from the shaft.

DESCRIPTION OF THE PREFERRED EMBODIMENT

The invention herein will be described with reference to a cylinder and a piston for mounting a tapered hub to a tapered shaft. It is to be understood of course that this apparatus could be used to mount a hub to a shaft of different configuration. It is additionally to be understood that this hub could be the hub of a coupling, the hub of an impeller, or any similar structure which needs to be forced onto or off of a shaft. Furthermore, the hub and shaft could be keyed as shown although not necessary. Other similar applications might be for mounting bearings or seals on a shaft.

Figure 1:
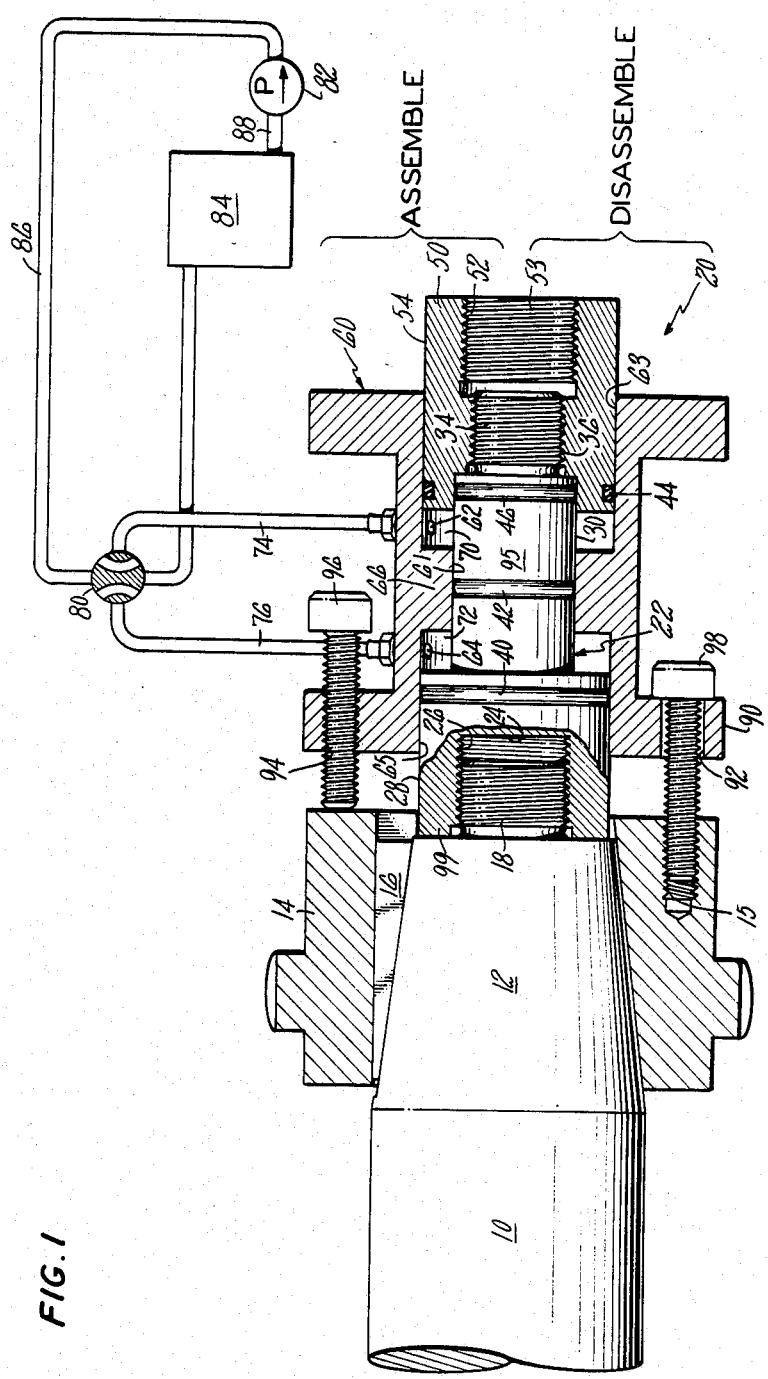
FIG. 1 is a sectional split view of the assembly shown with the top half having the components positioned to mount the hub to the shaft and the bottom half having the components positioned to remove the hub from the shaft.

As shown in FIG. 1, the top half of the diagram shows the apparatus in position for assembling the hub to the shaft. The bottom half of the drawing shows the apparatus in position for removing the hub from the shaft. All the apparatus is annular in configuration and the sectional view as shown is representative of the entire configuration.

In FIG. 1, it can be seen that shaft 10 inludes tapered portion 12 and threaded end 18. Key 16 is mounted in tapered portion 12 of the shaft and extends into coupling 14 to prevent relative rotation between the coupling and the shaft. Coupling 14 includes tapped opening 15 into which bolt 98 may be threadably engaged when the coupling hub is to be disassembled from the shaft.

Assembly 20 includes cylinder 22 having a cylinder end portion 99 defining an internal chamber 24 having threads 26 on the surface of the chamber. The cylinder end portion 99 additionally defines an exterior surface 28 which is a sliding surface which may mate with the piston. Connected to cylinder end portion 99 is center portion 95 having a lesser diameter. Connected to center portion 95 is end portion 34 having threads 36. Threadably secured to end portion 34 via threads 36 is collar 50. Collar 50 is sized to be the same exterior diameter as end portion 99 and defines on its exterior sliding surface 54 to mate with the piston.

Piston 60 is annular in configuration and extends about the cylinder and includes a plurality of sliding surfaces which mate with the sliding surfaces of the cylinder such that there may be reciprocating motion between the two. The piston includes piston projection 66 which extends inwardly from the piston to mate with the exterior surface of center portion 95 of cylinder 22. Additionally, the piston defines piston surface 65 which slides relative to cylinder surface 28, piston surface 61 which slides relative to cylinder surface 30 and piston surface 63 which slides relative to sliding surface 54 of the collar. Piston flange 90 is shown extending radially outward from the piston and defines a tapped opening 94 through which bolt 96 is threadably secured and clearance opening 92 through which bolt 98 may be passed.

Seals 40, 42, 44 and 46 are strategically mounted between the respective sliding surfaces such that cavities 70 and 72 are defined on either side of piston projection 66. Connected to cavity 70 through oil inlet 62 is first supply line 74. Connected to second cavity 72 through oil outlet 64 is second supply line 76. Both the first supply line 74 and second supply line 76 are connected to four-way valve 80 as is discharge line 86 and suction line 88. High pressure pump 82 for supplying fluid under pressure is shown connected via discharge line 86 to four-way valve and via suction line 88 through reservoir 84 to the four-way valve.

The four-way valve is designed such that it may be positioned in a first position wherein high pressure fluid is supplied to cavity 70 forcing the piston to be displaced to the left and fluid is displaced from cavity 72. When the four-way valve position is changed, fluid is supplied in the opposite direction so that the high pressure fluid is supplied to cavity 72 and fluid is received from cavity 70 such that as shown in the bottom half of the Figure the piston is moved to the right to disassemble the hub from the shaft.

It is also to be noted that internal threads 26 of chamber 24 are right-hand threads whereas the threads 52 of collar 50 are left-hand threads. Since the assembly is symmetrical should the shaft have left-hand threads the assembly can simply be reversed with the collar engaging the threaded end of the shaft and the cylinder end portion 99 being in the position where the collar is shown. In this manner the same device may be used for both left-handed threads and right-handed threads.

Operation

To mount a hub to a shaft the assembly is used as shown in the top half of FIG. 1. First the cylinder 22 is threadably engaged to threaded end 18 of the shaft maintaining a constant mechanical connection between the two. Since the coupling hub has been already mounted on the tapered portion of the shaft, the piston may thereafter be mounted on the cylinder and the collar mounted on the cylinder to secure the piston in position. A series of bolts 96 is then placed through threaded openings 94 and tightened to engage the coupling hub. The appropriate pressurized fluid flow connections are then made, the pump started and high pressure fluid is supplied through the four-way valve through oil inlet to the first cavity 70. This pressurized fluid creates a force acting on the piston through projection 66 which displaces the piston to the left. The piston acting through bolts 96 engages the coupling hub to displace the coupling hub to the left until it is fully mounted on the shaft.

To remove the hub from the shaft the direction of pressurized fluid supplied to the assembly is reversed. Referring to the bottom half of FIG. 1, it is seen that a series of bolts having threads which engage tapped openings 15 of the coupling are inserted through clearance openings 92 in the piston flange. These bolts are tightened until the head of the bolt engages the piston flange. Thereafter pressurized fluid is supplied to second cavity 72 which displaces projection portion 66 of the piston to the right forcing the piston to travel to the right, said piston engaging the head of bolts 98 to displace them to the right thereby displacing the coupling hub to the right removing it from the shaft. In this manner the coupling hub is removed from the shaft by the reversal of the application of the pressurized fluid to the appropriate pressure cavity.

Although bolts 98 are shown extending through clearance opening 92, it is to be understood that it is conceivable that the same tapped openings 94 as used in the assembled half of the drawing could be utilized if the piston flange could be appropriately aligned with the tapped openings in the hub.

Alternative Embodiment

Figure 2:
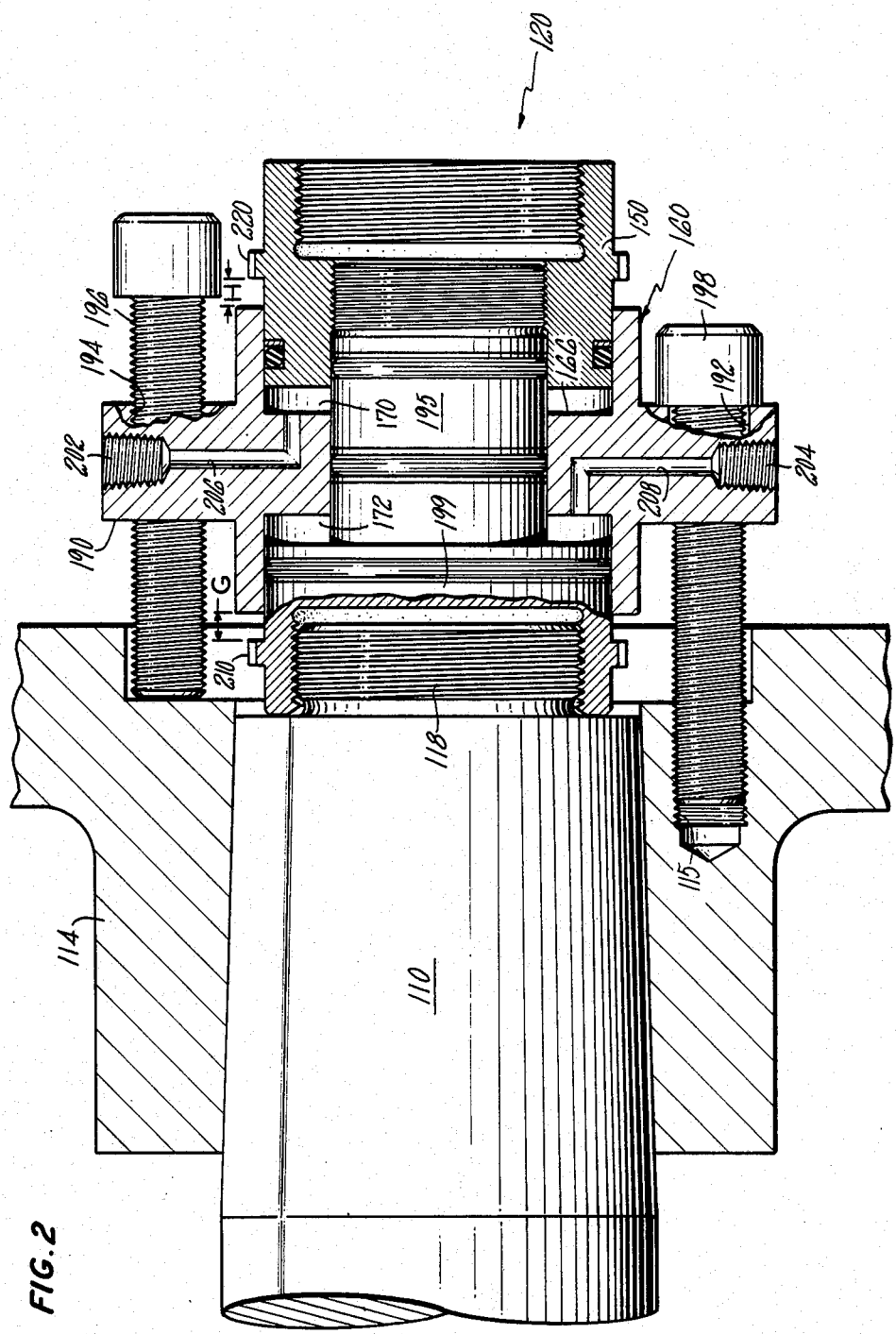
FIG. 2 is a sectional split view of an alternative embodiment of the assembly with the top half having the components positioned to mount the hub to the shaft and the bottom half having the components positioned to remove the hub from the shaft.

FIG. 2 shows an alternative embodiment of the assembly for mounting and removing a hub from a shaft.

For the sake of clarity, 100 has been added to the reference numerals used in FIG. 1 to point out the common items in FIG. 2. Numerous small details referenced in FIG. 1 have been omitted from FIG. 2.

In the alternative embodiment of FIG. 2, it can be seen an assembly 120 is made up of cylinder end portion 199, center portion 195 and collar 150. Cylinder end portion 199 is threadably engaged to threaded end 118 of shaft 110 upon which coupling 114 is to be mounted. Piston 160 is mounted about the cylinder and defines cavities 170 and 172 into which oil is forced to cause the piston to reciprocate in one direction or the other. The piston defines a projection portion 166 which mates with the center portion of the assembly to help define the two fluid cavities 170 and 172. The piston defines an outwardly projecting flange 190. Within flange 190 are tapped openings 194 through which bolts 196 may be threadably engaged to be advanced to engage the coupling 114 when it is desired to force the coupling onto the shaft. Flange 190 additionally defines clearance opening 192 through which bolt 198 may slide and then be threadably engaged with tapped opening 115 of the coupling such that upon displacement of the piston the bolt acts to draw the coupling from the shaft.

Additionally, within flange 190 are defined oil inlet opening 202, and oil outlet opening 204 together with conduit 206, connecting oil inlet opening 202 to cavity 170 and conduit 208 connecting oil opening 204 to cavity 172.

Fluid under pressure is supplied through a similar system to that shown in FIG. 1 such that pressurized fluid is directed through inlet 202 through conduit 206 to cavity 170 to force the piston to the left to mount the coupling. Fluid discharged from cavity 172 is directed through conduit 208 out oil outlet 204 in the mounting mode of operation. When operation is reversed, the oil flow is reversed and oil is pumped in oil outlet 204 through conduit 208 to cavity 172 to force the piston in the opposite direction. Oil from cavity 170 is discharged through conduit 206 and oil inlet 202.

Reference projections 210 and 220 extend radially outward on the exterior surface of the assembly and are used in conjunction with the end piston to observe the amount of travel as the coupling is either mounted or removed from the hub. Reference projection 210 is shown a distance G from the end of the piston. By observing the size of this gap G, the amount of travel of the piston is known. The distance H shown between projection 220 and the other end of the piston is used for gauging the distance the piston has traveled when moving in the opposite direction.

A simple, easy to use and reversible assembly for mounting and removing a hub from a shaft has been disclosed. The device further includes simplified means for changing the device to be adapted to either left-handed or right-handed threaded end portions of the shaft. A simple reversing of the valve is utilized to change the direction of the pressurized fluid flow to forceably direct the piston of the assembly in one direction or the other.

The invention has been shown and described with reference to a particular embodiment. It is to be understood by those skilled in the art that variations and modifications can be effected within the spirit and scope of the invention.

I claim:

1. An aassembly for mounting and removing a hub from a shaft having a portion for receiving the hub and a threaded end portion, said hub having an internal bore configured to mate with the shaft and at least one tapped opening which comprises:
   cylinder means including end portions defining a threaded chamber at each end sized to threadably coact with the threaded end portion of the shaft and a center portion defining a sliding surface;
   a piston mounted for reciprocating motion about the cylinder means and including a projection which mates with the sliding surface of the cylinder center portion, said piston and cylinder means defining a first cavity and a second cavity between the cylinder means and the piston, said cavities being located on opposite sides of the projection;
   piston flange means extending from the piston and including means to transmit force from the piston to the hub for forcing the hub on the shaft and means for transmitting force from the piston to the hub for removing the hub from the shaft;
   means for supplying fluid under pressure to the first cavity to displace the piston relative to the cylinder to force the hub on the shaft; and
   means for supplying fluid under pressure to the second cavity to displace the piston relative to the cylinder to force the hub off the shaft.

2. The apparatus as set forth in claim 1 wherein the cylinder means further comprises each end portion having a larger diameter than the center portion, each end portion defining an exterior sliding surface and wherein the piston includes piston and portion surfaces coacting with said end exterior sliding surfaces to further define said first cavity and said second cavity.

3. The apparatus as set forth in claim 1 wherein the piston flange means defines both tapped openings and clearance openings and wherein a threaded bolt is engaged in tapped opening to extend and engage the hub for forcing the hub on the shaft and a threaded bolt extends through the clearance opening without engagement to be threadably engaged with the tapped opening of the hub for transmitting forces to remove the hub from the shaft.

4. The apparatus as set forth in claim 1 wherein the means for supplying fluid under pressure to the first cavity further comprises a source of high pressure fluid and a four-way valve such that supplying fluid under pressure may be directed by the four-way valve to the first cavity or to the second cavity.

5. The apparatus as set forth in claim 2 wherein one cylinder means end portion is a collar threadably secured to the cylinder center portion, wherein the piston is annular in configuration and wherein the collar secures the piston on the cylinder.

6. The apparatus as set forth in claim 1 wherein one threaded chamber is threaded with right-hand threads and the other threaded chamber is threaded with left-hand threads.

7. An assembly for mounting and removing a hub from a shaft having a threaded end portion which comprises:
   cylinder means including means for engaging the threaded end portion of the shaft and means defining a sliding surface;
   piston means having piston sliding surfaces coacting with the cylinder means sliding surface to define a first cavity and a second cavity;
   means for supplying fluid under pressure to the piston means including supplying fluid under pressure to the first cavity to displace the piston in a first direction and to the second cavity to displace the piston in an opposite second direction; and
   means mounted to the piston means for translating the motion generated by the displacement of the piston in either direction to the hub to either mount or remove the hub from the shaft.

8. The apparatus as set forth in claim 7 wherein the means for supplying further comprises a source of pressurized fluid, a four-way valve and piping connecting the four-way valve to the first cavity and the second cavity whereby in a first position pressurized fluid is directed by the four-way valve to the first cavity and fluid is received from the second cavity, and in a second position pressurized fluid is directed to the second cavity and received from the first cavity.

9. The apparatus as set forth in claim 7 wherein the means for translating the motion further comprises piston flange means formed as a part of the piston, said flange means including tapped holes in which bolts may be threadably engaged and clearance holes through which bolts may be slidably engaged.

10. The apparatus as set forth in claim 7 wherein the cylinder means is reversible and includes left-hand threads on one end and right-hand threads on the other end thereby allowing the assembly to be used with shafts having either left-hand or right-hand threads.

* * * * *